United States Patent
Judet et al.

(10) Patent No.: US 9,890,652 B2
(45) Date of Patent: Feb. 13, 2018

(54) TURBINE WHEEL FOR A TURBINE ENGINE

(71) Applicant: Snecma, Paris (FR)

(72) Inventors: Maurice Guy Judet, Moissy Cramayel (FR); Pierre Guillaume Auzillon, Moissy Cramayel (FR); Matthieu Simon, Moissy Cramayel (FR)

(73) Assignee: SNECMA, Paris (FR)

( * ) Notice: Subject to any disclaimer, the term of this patent is extended or adjusted under 35 U.S.C. 154(b) by 296 days.

(21) Appl. No.: 14/869,312

(22) Filed: Sep. 29, 2015

(65) Prior Publication Data

US 2016/0090855 A1 Mar. 31, 2016

(30) Foreign Application Priority Data

Sep. 29, 2014 (FR) ...................... 14 59224

(51) Int. Cl.
*F01D 5/02* (2006.01)
*F01D 5/12* (2006.01)
*F01D 5/22* (2006.01)
*F01D 11/00* (2006.01)
(Continued)

(52) U.S. Cl.
CPC .............. *F01D 11/006* (2013.01); *F01D 5/02* (2013.01); *F01D 5/082* (2013.01); *F01D 5/12* (2013.01); *F01D 5/225* (2013.01); *F01D 5/3015* (2013.01); *F05D 2220/323* (2013.01); *F05D 2240/24* (2013.01); *F05D 2240/55* (2013.01); *F05D 2240/80* (2013.01); *F05D 2260/231* (2013.01); *Y02T 50/676* (2013.01)

(58) Field of Classification Search
CPC ... F01D 5/02; F01D 5/082; F01D 5/12; F01D 5/225; F01D 5/3015; F01D 11/06; F05D 2220/323; F05D 2240/24; F05D 2220/55; F05D 2220/80; F05D 2260/231; Y02T 50/676
See application file for complete search history.

(56) References Cited

U.S. PATENT DOCUMENTS

| | | |
|---|---|---|
| 4,803,893 A | 2/1989 | Bachinski |
| 5,018,943 A * | 5/1991 | Corsmeier ............ F01D 5/027 |
| | | 416/144 |

(Continued)

FOREIGN PATENT DOCUMENTS

| | | |
|---|---|---|
| EP | 1 498 579 A1 | 1/2005 |
| EP | 2 441 920 A2 | 4/2012 |
| WO | WO 2012/136917 A1 | 10/2012 |

*Primary Examiner* — Igor Kershteyn
(74) *Attorney, Agent, or Firm* — Blank Rome LLP

(57) ABSTRACT

A rotating assembly for a turbine engine, comprising a disc having an outer periphery having alternating slots and teeth, blades radially extending from the disc and roots of which are axially engaged in the slots, with spaces called slot cavities being provided between the roots of the blades and the slots, platforms laterally extending from the blades and circumferentially arranged end-to-end, so as to form spaces called inter-blade cavities, and a downstream annular shroud, comprising an outer annular sealing lip opposite the downstream ends of the platforms. The downstream shroud further comprises an intermediate annular sealing lip opposite the downstream faces of the teeth of the disc, radially between the slot cavities and the inter-blade cavities.

7 Claims, 2 Drawing Sheets

(51) Int. Cl.
*F01D 5/08* (2006.01)
*F01D 5/30* (2006.01)

(56) References Cited

U.S. PATENT DOCUMENTS

| | | | | |
|---|---|---|---|---|
| 6,106,234 | A * | 8/2000 | Gabbitas | F01D 5/3015 416/220 R |
| 7,040,866 | B2 * | 5/2006 | Gagner | F01D 5/3015 416/220 R |
| 7,238,008 | B2 * | 7/2007 | Bobo | F01D 5/3015 416/220 R |
| 8,662,845 | B2 * | 3/2014 | Virkler | F01D 5/066 415/115 |
| 8,740,554 | B2 * | 6/2014 | Virkler | F01D 5/3015 415/173.7 |
| 8,840,375 | B2 * | 9/2014 | Virkler | F01D 5/066 416/221 |
| 2005/0042108 | A1 * | 2/2005 | Benderradji | F01D 5/3015 416/221 |
| 2012/0093649 | A1 * | 4/2012 | Halfmann | F01D 5/3015 416/95 |
| 2015/0159496 | A1 * | 6/2015 | Pouzet | F01D 5/3015 415/171.1 |

* cited by examiner

TURBINE WHEEL FOR A TURBINE ENGINE

BACKGROUND OF THE INVENTION

1. Field of the Invention

The invention relates to a rotating assembly for a turbine engine, such as in particular an aircraft jet engine, and a turbine engine including such an assembly.

2. Description of the Related Art

The pre-existing state of the art, which the invention has provided developments and non-negligible advantages to, is described hereunder, while referring to FIGS. 1 and 2. Although the invention can be adapted to the various stages of a turbine engine, it shall be illustrated when it is provided on one stage of a high-pressure turbine. As a matter of fact, the invention is most interesting in such an environment.

According to the known state of the art, a high-pressure turbine thus comprises a disc 10, and blades 12 radially extending outwards from the disc and roots of which, the inner ends of which are referenced 14, are axially engaged in slots, the bottoms of which slots are referenced 16, of the outer periphery of the disc, and radially held by teeth of the disc, the outer ends of which are referenced 18, alternating with said slots. So-called slot cavities 20a, 20b are formed by spaces radially located between the walls of the blade roots 14 and the walls of the slots 16, and which axially extend in the downstream direction of the slots. When rotating, and as a result of the centrifugal effects, the blades are radially pushed outwards, against the side flanks of the teeth 18. Such flanks are also called disc teeth faces. On the high-pressure turbine stage shown, the roots 14 of the blades 12 have two radial stages, an outer one 14a and an inner one 14b, with each of such root stages being held by a pair of faces from two adjacent teeth 18 of the disc also consisting of two stages, an outer one 18a and an inner one 18b. The roots 14 and the teeth 18 thus each are shaped as two radially stacked bulbs. Teeth 18 and roots 14 are also called "fir-tree" elements. In such a configuration outer slot cavities 20a are formed between the outer stages of the roots 14a and the teeth 18a, and inner slot cavities 20b are formed between the inner stages of the roots 14b and the teeth 18b.

The expression "axially" is to be considered in relation to the longitudinal axis 50 of the turbo machine. As a consequence, "substantially axially" means a direction substantially parallel to said axis 50, to the extent of more or less 10°-15°, globally along which gases (F) flow and around which the rotating assembly rotates.

The blades 12 also comprise inner platforms 22 which extend laterally and which are circumferentially arranged end to end so as to define, together, the inner cylindrical or tapered limit of the hot gas flow circulating in the turbine. The part of the blade 12 located inside relative to the jet, i.e. between the inner platform 22 and the root 14, is called a stilt 24. With such positioning, spaces are formed between two adjacent stilts 24 in the circumferential direction, and between the platforms 22 and the teeth 18 in the radial direction, and form so-called inter-stilts or inter-blade cavities 26. The platforms 22 each have substantially radial walls 22a, 22b, in addition to a cylindrical or tapered wall 22c, which extend therefrom inwards from the respective upstream and downstream ends thereof, so as to partially cover and isolate the upstream and the downstream of the inter-blade cavities 26. One opening however remains between the teeth 18 and the walls 22a, 22b of the platforms 22, so that a flow can axially circulate through the inter-blade cavities.

An upstream annular shroud 28 is provided upstream of the disc 10; Such shroud has an annular hook 30a engaged with an annular hook 30b of the upstream face of the disc 10, and the inner end of the shroud is further bolted to an upstream flange of the disc 10 (such bolting is not shown in the figure). The outer end of the shroud 28 is arranged against the upstream faces of the teeth 18 of the disc and the roots 14 of the blades 12, so that the shroud 28 axially holds the blades 12 in the slots 16 of the disc 10. More particularly, the outer end of the shroud 28 comprises an annular lip 32 protruding downwards, which rests against the above-mentioned upstream faces. Resting may not be perfect, because of the clearances between the parts. As resting is radially located between the outer slot cavities 20a and the inner slot cavities 20b, sealing is created between such two series of slots, upstream of the disc.

A downstream annular shroud 34 is provided downstream of the disc 10; Such downstream shroud 34 is held on the downstream face of the disc 10 by annular hook systems 36a at the inner end of the shroud cooperating with annular hooks 36b of the downstream face of the disc 10. Such downstream shroud 34 comprises an outer annular lip 38 protruding in the upstream direction, and located opposite, or even resting against, the downstream ends of the platforms 22, and more particularly the downstream radial walls 22b. Such downstream shroud 34 also comprises an inner annular lip 40 protruding in the upstream direction, and located opposite, or even resting against the downstream faces of the teeth 18 and the roots 14 of the blades, radially between the outer slot cavities 20a and the inner slot cavities 20b. The inner lip 40 makes it possible to create sealing between the outer slot cavities 20a and the inner slot cavities 20b, downstream of the disc. The outer lip 38 makes it possible to create sealing between the jet and the inter-blade cavities 26 downstream of the blades. With such an arrangement, the downstream shroud 34 also aims at axially holding the blades 12 in the slots 16 of the disc 10.

With such an arrangement, it can be seen that a flow can circulate between the inter-blade cavities 26 and the outer slot cavities 20a, from the upstream or downstream of the disc 10, whereas the inner slot cavities 20b are totally isolated from the other cavities 26, 20a, by the lip 32 of the upstream shroud 28 and the inner lip 40 of the downstream shroud 34.

As mentioned above, the bladed disc discussed here is mounted in the high-pressure turbine of a turbine engine. This is the reason why it can be seen in the figure that it is positioned just downstream of a combustion chamber 42 and of a high-pressure distributor 44, conventionally known from the prior art.

In order to increase the performances of the turbine engine, and to avoid the heating of the disc 10 and the upstream shroud 28 by the flow of hot gases from the upstream combustion chamber and flowing through the jet, it is important to limit as much as possible the flowing of hot gases from the combustion chamber 42 inwards, between the high-pressure distributor 44 and the bladed disc. As a matter of fact, such two stages are axially separated by a certain distance, which forms an annular-shaped discontinuity 46 at the inner limit of the gas jet. Such gases could theoretically flow inwards through such discontinuity 46 and damage the turbine engine. For this purpose, pressurized cold air is taken-off upstream of the combustion chamber in a low-pressure or high-pressure compressor stage, and is transferred to the annular space 46 upstream of the disc 10 and downstream of the high-pressure distributor by a circuit 51 inside the jet. More precisely, a portion of the pressurized cold air (arrow 1) is transferred upstream of the upstream shroud 28 and the other portion (not shown) between the upstream shroud 28 and the disc 10.

The portion of pressurized cold air (arrow 1) which is transferred upstream of the upstream shroud 28 thus flows outwards, along the shroud 28, towards the annular discontinuity 46 of the jet, thus cooling the shroud 28 and the upstream faces of the disc teeth 18, while the pressure and rate thereof prevent the jet gases from flowing inwards, through same discontinuity 46 (arrow 3). The same portion of pressurized cold air circulates in the outer slot cavities 20a (arrow 2) to better cool the outer periphery of the disc 10, on the whole axial extent thereof.

The portion of the pressurized cold air which is transferred downstream of the upstream shroud 28, between same shroud 28 and the disc 10, circulates in the inner slot cavities 20b and supplies a series of conduits (not shown) formed inside the blades 12, and more particularly opening on the trailing edges, leading edges, suction sides and pressure sides thereof. Such conduits cool down the blades 12, which enables these to resist the hot gases from the combustion chamber 42.

In FIG. 1, references 55, 57 indicate conduits which may usually form transferring means for such cooling air, up to the above-mentioned areas, and more specifically the slot cavities.

A series of studies and tests conducted on such architecture made it possible to demonstrate that the cooling air which circulates in the downstream direction through the outer slot cavities 20a then goes up to the outside at the periphery of the disc, along the downstream shroud 34 (arrow 5) and in fact recirculates in the upstream direction through the inter-blade cavities (arrow 4), to be ejected close to the jet discontinuity 46 (arrow 6). However, when the cooling air circulates along such circuit, its calorie content increases and it warms up, when in contact with the platforms, for instance, and transmits such heat to the cooling air having directly flown to the discontinuity 46. In order to keep an acceptable temperature at the periphery of the disc 10 and at the upstream shroud 28, a rather high cooling air rate had to be supplied so far, so as to compensate for such useless heat acquisition through the outer slot cavities 20a and the inter-blades cavities 26.

SUMMARY OF THE INVENTION

Starting from the above observation, the invention provides a simple, efficient and economical solution making it possible to reduce the heating of the cooling air and thus to reduce the effective rate of taken-off air. For this purpose, it provides a rotating assembly for a turbine engine, which comprises:

a disc having an outer periphery having alternating slots and teeth, which extend from one upstream face to a downstream face of the disc, blades radially extending from the disc and roots of which are axially engaged into the slots and radially held by the teeth of the disc, with said roots being fir-tree roots, with radially outer and radially inner holding stages in a form-fitting manner with respectively outer and inner faces of the flanks of the teeth of the disc, with outer slot cavities being provided between said outer faces and the outer stages of the blade roots and inner slot cavities being provided between said inner faces and the inner stages of the blade roots, and extending from the upstream face to the downstream face of the disc, platforms laterally extending from the blades and circumferentially arranged end to end, with respect to each other, so as to form spaces, also called inter-blade cavities, radially between the teeth of the disc and the platforms, downstream of the disc, a downstream annular shroud, with said shroud comprising an outer annular sealing lip opposite the downstream ends of the platforms and an inner annular sealing lip opposite the downstream face of the disc and radially between the outer and inner slot cavities, characterized in that the downstream annular shroud further comprises an intermediate annular sealing lip opposite the downstream faces of the teeth of the disk and the blade roots, radially between the outer slot cavities and the inter-blade cavities.

In the invention "lip" means an annular area of the shroud protruding in the upstream direction and toward the disc. Such lip may for instance have the shape of an axial rib, a dome-shaped area, a bending of the shroud, a bent end, etc. As defined, such lips are close enough to the downstream faces of the disc or the blades to create sealing. Although the lips do not necessarily have to rest on the above-mentioned downstream ends to create sealing, such arrangement may be preferred in some cases, and is thus taken into account by the invention.

The inner lip prevents cooling air circulating in such slots from uselessly circulating inwards, along the downstream shroud.

It should be noted that the fir-tree configuration ensures that the disc holds the blades with a greater force.

Ensuring sealing on the downstream face of the disc and the blades is economical, while avoiding heat-resistance problems, since air can circulate in the slots.

According to the above description of the invention, when cooling air circulates through the slot cavities in the downstream direction of the disc, the air cannot go radially up the downstream shroud since it is blocked by the intermediate annular lip of the shroud. The cooling air thus no longer recirculates in the upstream direction through the inter-blades cavities, and no longer brings stored heat through the above-mentioned cavities to the cooling air already transferred upstream the periphery of the disc.

It should be understood that the invention perfectly applies, and is very advantageous to the environment described while referring to FIG. 1, although it is useful as soon as cooling air is transferred upstream of the rotating assembly, as a compensation for the heating caused by the jet. The scope of the invention can thus more generally cover the rotating assembly mentioned above as connected to the most characteristic elements of the operation of the environment in FIG. 1, either separately or in combination.

The disc is thus advantageously a turbine disc, more particularly a high-pressure turbine of a turbine engine. As a matter of fact, the cooling problems are most sensitive to such localization, because of the direct proximity of the combustion chamber.

The downstream shroud will preferably be held on the disc by hook systems or by bolts, for instance.

According to one characteristic, an upstream annular shroud is arranged upstream of the disc and axially holds the roots of the blades in the slots. As a matter of fact, it is always necessary to make sure that the blades cannot slide either upstream or downstream of the disc, since the downstream shroud already ensures the holding downstream.

The platforms advantageously comprise, at the upstream and downstream ends thereof, radial walls which extend inward and partially partition the axial, i.e. upstream and downstream ends of the inter-blades cavities, with the outer lip of the downstream shroud being arranged opposite such downstream radial walls of the platforms. Such radial walls provide, among other things, a correct support for the outer lip of the shroud on the platforms, and thus a better sealing.

As could be understood, the invention is more clearly advantageous when cooling air is transferred to the outer periphery of the downstream face of the disc and supplies the slot cavities, via air transporting means.

The positioning of the various lips described above makes it possible to sealingly separate the inner slot cavities from the other cavities.

The invention also relates to an engine turbine, such as a jet prop engine or a turbojet, comprising a rotating assembly as described above.

BRIEF DESCRIPTION OF THE DRAWINGS

The invention will be better understood, and other details, characteristics and advantages of the invention will appear upon reading the following description given by way of a non-restrictive example while referring to the appended drawings wherein.

DETAILED DESCRIPTION OF THE PREFERRED EMBODIMENTS

Figure 1:
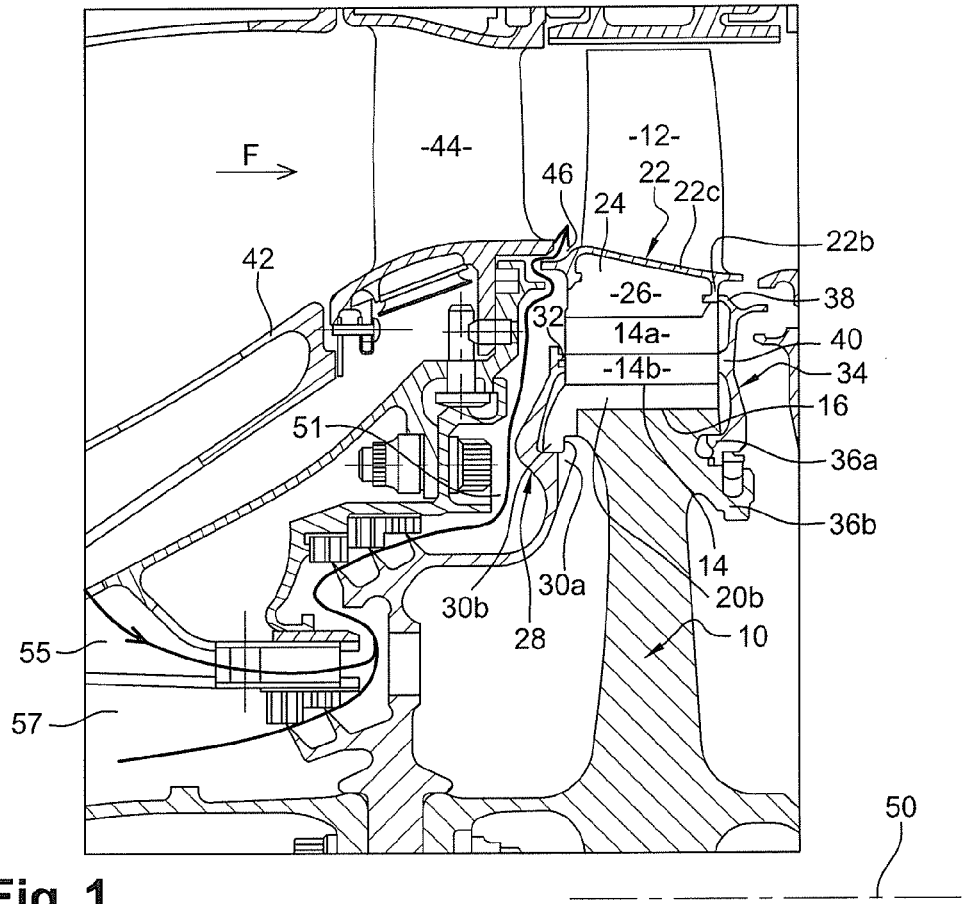
FIGS. 1 and 2, described above, are an axial cross-section and a view in perspective, respectively, of a portion of a high-pressure turbine of a turbine engine of the prior art.
Figure 2:
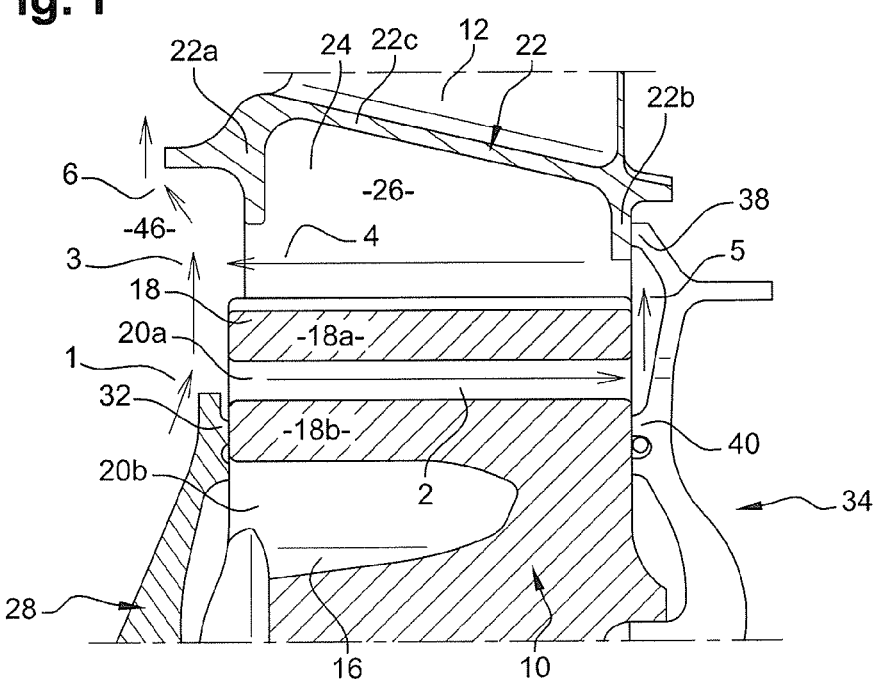
Figure 3:
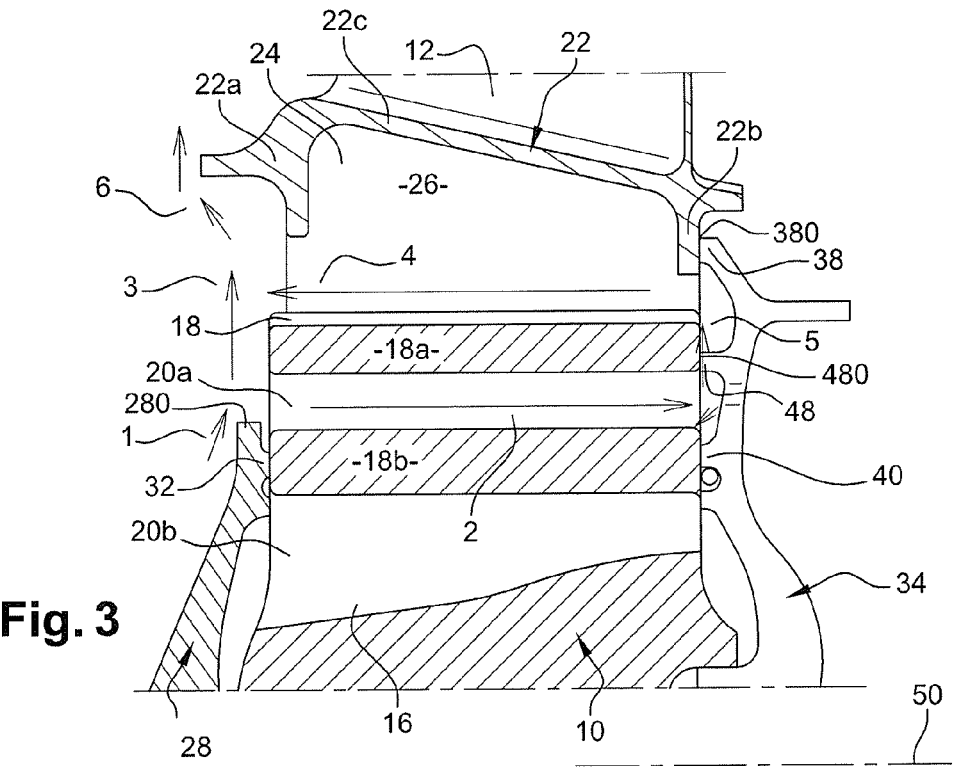
FIGS. 3, 4 and 5 are successively an axial cross-section and two side-views in perspective, from upstream and from downstream of a portion of the high-pressure turbine of a turbine engine according to the invention.
Figures 4, 5, 6:
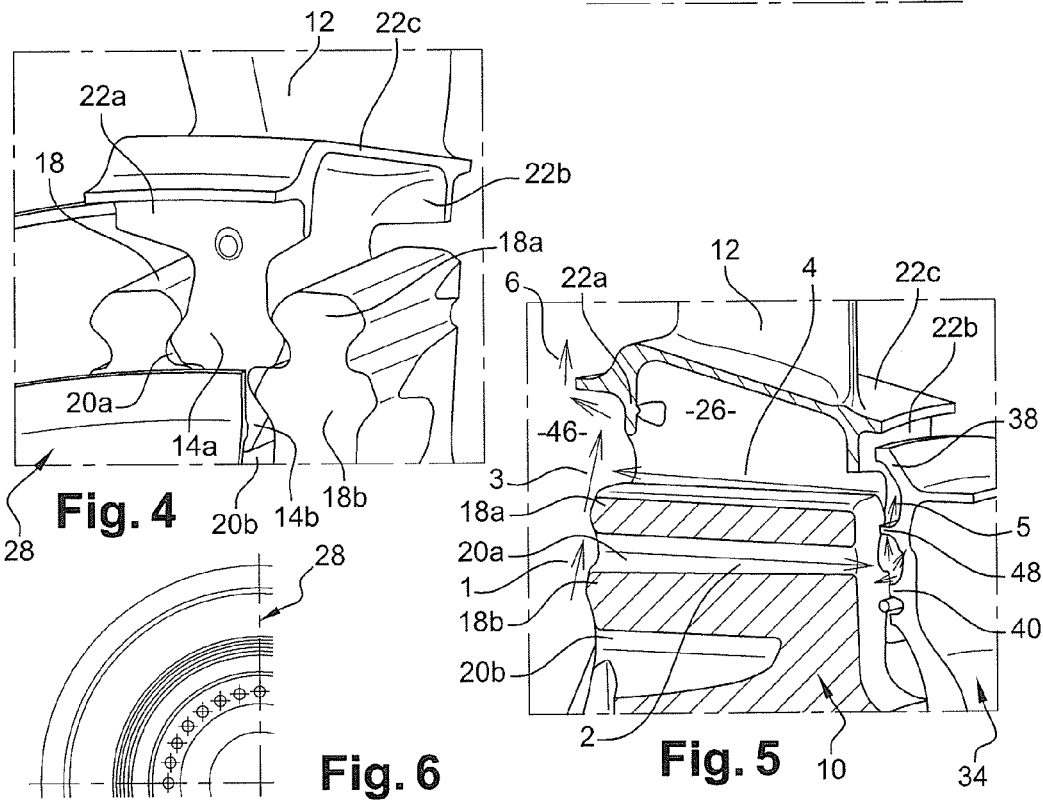
FIG. 6 shows any part of the upstream shroud, with the rest being built symmetrically.

FIGS. 3 to 5 show the environment already disclosed in FIGS. 1 and 2, and further show the applied invention.

It can be seen that the downstream annular shroud 34 comprises, in such figures, an intermediate annular lip 48, substantially as an axial rib which extends from the shroud in the upstream direction, and arranged opposite the downstream faces of the teeth 18 of the disc and end of the roots 14 of the blades 12, radially between the outer slot cavities 20*a* and the inter-blade cavities 26. In this radial position the roots 14 and the teeth 18 continuously alternate on the circumference, in operation, with the centrifugal force pushing the roots 14 against the faces of the teeth 18. As the roots 14 and the teeth 18 are provided so as to have the same axial dimensions, except of the manufacturing tolerances, the space provided for the circulation of the cooling air flow, from the outer slot cavities 20*a*, and flowing outwards (arrow 5) between the downstream shroud 34 and the disc 10 is easily controlled, while adjusting the axial dimension of the intermediate lip 48. A small axial space can be left between the intermediate lip 48 and the downstream ends of the blade roots 14 and the disc teeth 18, which will reduce the rate as compared to the prior art, while enabling, however, the cooling of the outer part of the shroud 34, for instance. Providing an axial clearance ranging from 0.5/10 to 8/10 mm for the circulation along the arrow 4 is advised, although the intermediate lip 48 could totally rest against the ends, which would totally close the passage of the cooling air to the outside, downstream of the disc. Statically indeterminate support will thus be avoided. As a matter of fact, it is recommended that the axially upstream end 480 of the intermediate lip 48 should be located slightly downstream of the axially upstream end 380 of the outer annular lip 38 (distance d in FIG. 3; refer to the axial clearance above).

In every case, the recirculation rate of cooling air, in the upstream direction, into the inter-blade cavities 26 (arrow 4) will be reduced (limited; air shall be slowed down). Heat gain upstream of the outer periphery of the disc 10 at the jet 46 discontinuity caused by same recirculation, will advantageously be reduced by approximately 40° C., as per the executed tests. This will make it possible to reduce the taking-off of cold air upstream of the turbine engine, at the low-pressure or high-pressure compressor stages, while having the same efficiency as in the prior art, as regards the cooling of the disc 10 and the upstream shroud 28. Such air, which has not been taken off, will then participate in the actual thrust of the turbine engine, and will enhance the force and consumption performances of the turbine engine.

As has already been mentioned above, and although the disclosed invention is connected with a rotating stage of a high-pressure turbine of a turbine engine, since it provides a real enhancement and significantly participates in increasing the performances of a turbine engine in this regard, the invention may also be applied to any rotating state since it can provide a significant improvement when cooling is required.

It should also be noted that in the invention, and as far as downstream sealing provided by the annular lips 38, 40, 48 is concerned, it has been decided:

not to radially extend inwards the curb 22*a*, so as not to increase the weight of the blades, and not to radially extend outwards the radial curb 280 at the outer end of the shroud 28. As a matter of fact, it should be noted that this short curb 280 leaves the access to the slots 20*a* open to the air flowing in the circuit 51, which makes it possible to avoid heat-resistance problems with the materials.

It should also be noted that, although FIG. 5 could lead one to think that the inner slot cavities 20*b* could not extend from the upstream face to the downstream face of the disc, this is not true. The section plane selected leads to this feeling; the general direction of the cavities 20*b* here forms an angle of a few degrees with the axis 50. This is not the case in FIG. 3.

In FIG. 6, a part of the upstream shroud 28 which is annular, i.e. a 360°, not sectorized, ring like the downstream annular shroud 34 (refer to FIG. 5) is schematically shown.

What is claimed is:

1. A rotating assembly for a turbine engine comprising:
    a disc having an outer periphery having alternating slots and teeth, which extend from an upstream face to a downstream face of the disc,
    blades radially extending from the disc and roots of which are axially engaged into the slots and radially held by the teeth of the disc, with said roots being fir-tree roots, with radially outer holding stage and a radially inner holding stage in a form-fitting manner with respectively an outer face and an inner face of the flanks of the teeth of the disc, with outer slot cavities being provided between said outer face and the outer holding stage of the blade roots and inner slot cavities being provided between said inner face and the holding inner stage of the blade roots, and extending from the upstream face to the downstream face of the disc,
    platforms laterally extending from the blades and circumferentially arranged end to end, with respect to each other, so as to form inter-blade cavities, radially between the teeth of the disc and the platforms, downstream of the disc, a downstream annular shroud, with said downstream annular shroud comprising an outer annular sealing lip located opposite the downstream ends of the platforms and an inner annular sealing lip located opposite the downstream face of the disc and radially between the outer and inner slot cavities, wherein the downstream annular shroud further comprises an intermediate annular sealing lip located opposite the downstream faces of the teeth of the disk and the blade roots, and radially between the outer slot cavities and the inter-blade cavities.

2. The rotating assembly according to claim 1, wherein the disc is a high-pressure turbine disc of a turbine engine.

3. The rotating assembly according to claim 1, wherein an upstream annular shroud is arranged upstream of the disc and axially holds the roots of the blades in the slots.

4. The rotating assembly according to claim 1, wherein the platforms comprise, at upstream and downstream ends thereof, radial walls which extend inwards and partially partition axial ends of the inter-blades cavities, with the outer annular sealing lip of the downstream shroud annular being arranged opposite the downstream radial walls of the platforms.

5. The rotating assembly according to claim 1, further comprising means for transferring cooling air to the outer periphery of the downstream face of the disc by supplying with air said inner and outer slot cavities of the disc.

6. The rotating assembly according to claim 3, wherein the upstream shroud comprises an annular sealing lip located opposite the downstream faces of the teeth of the disk and the blade roots, and radially between the outer slot cavities and the inter-blade cavities, the intermediate annular sealing lip of the downstream shroud is radially located outside the outer slot cavities, and the inner annular sealing lip of the downstream shroud is radially located between the outer slot cavities and the inner slot cavities, wherein the rotating assembly further comprises means for transferring cooling air to the outer periphery of the downstream face of the disc by supplying with air said inner and outer slot cavities of the disc, the cooling air transferring means being adapted to transfer such air to the outer periphery of the downstream face of the disc, on each side of the upstream annular shroud and supply the outer and inner slot cavities.

7. A turbine engine, comprising a rotating assembly according to claim 1.

* * * * *